United States Patent [19]

Grunberg

[11] Patent Number: 4,509,185

[45] Date of Patent: Apr. 2, 1985

[54] TIME DOMAIN AUDIO PANNER

[76] Inventor: Robert M. Grunberg, 15 Fairfax Rd., Bellevue Hill, N.S.W., 2023, Australia

[21] Appl. No.: 512,136

[22] Filed: Jul. 25, 1983

[30] Foreign Application Priority Data

Aug. 9, 1982 [AU] Australia ........................ PF5284/82

[51] Int. Cl.$^3$ ............................................. G11B 13/00

[52] U.S. Cl. ........................................ 381/34; 360/32; 369/5

[58] Field of Search ....................... 381/17, 32, 33, 34, 381/35, 124; 360/32, 39, 65; 369/3, 4, 5

[56] References Cited

U.S. PATENT DOCUMENTS 3,295,107 12/1966 Stalcup ............................ 381/34 X
3,949,175 4/1976 Tanizoe et al. ....................... 381/34
4,065,795 12/1977 Shutterly .......................... 360/32 X
4,206,476 6/1980 Hashimoto ........................ 360/32 X

OTHER PUBLICATIONS

"Digital Audio System for Professional Use", by Matsushima et al., National Technical Report (Japan), vol. 26, No. 6, Dec. 1980, pp. 938–946.

*Primary Examiner*—R. J. Hickey
*Attorney, Agent, or Firm*—Stevens, Davis, Miller & Mosher

[57] ABSTRACT

A time domain panner samples a single analogue audio input signal and digitizes it into a 16-bit linear PCM representation which is fed into a memory array having a plurality of memory locations. A multiplexer feeds this memory array and continuously cycles in response to an address counter which repetitively counts to a maximum count. Address words produced by the address counter may address the array with or without add words, and a selected channel of the multiplexer points to a value stored in the memory array at a location established by the address counter plus an offset. Analogue output signals provided from left and right analogue output channels are time shifted selectively with respect to the analogue input signal and with respect to each other. Accordingly, analogue audio input signals are provided by a single signal source, fed into a memory array, and left and right analogue output channels are time-shifted with respect to the input excitement, and with respect to each other.

3 Claims, 2 Drawing Figures

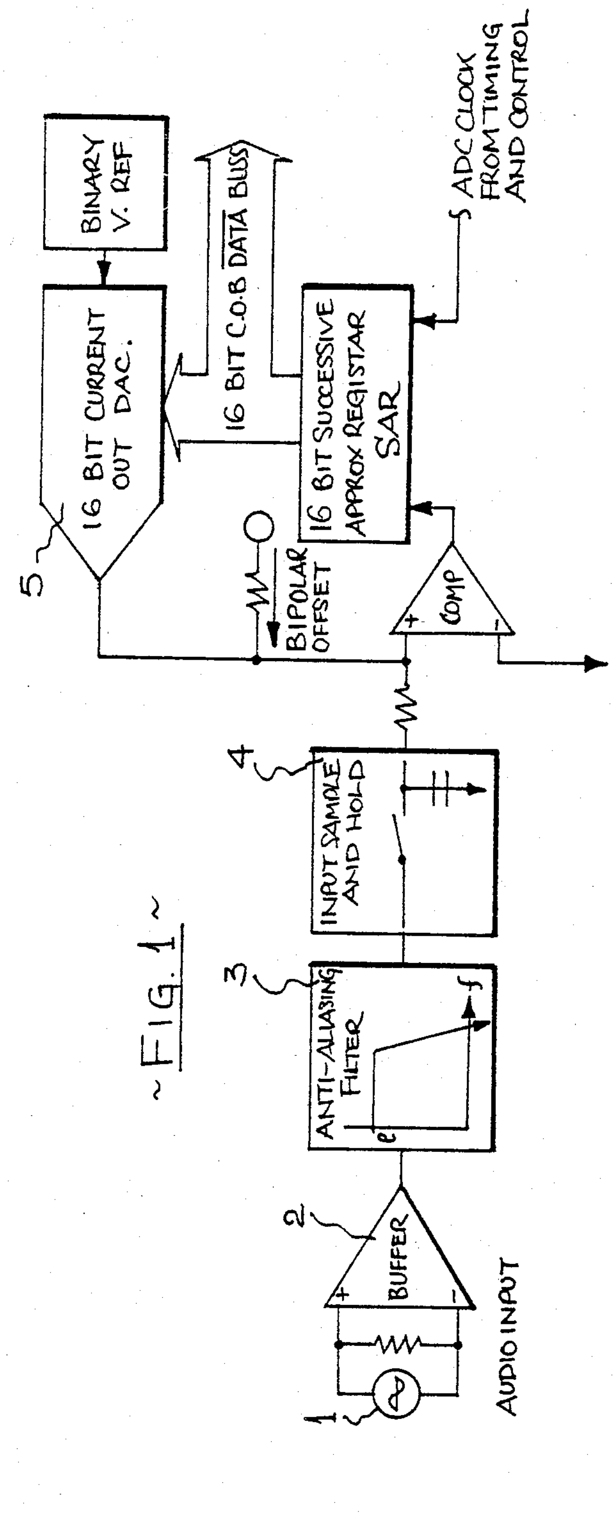
~FIG. 1~

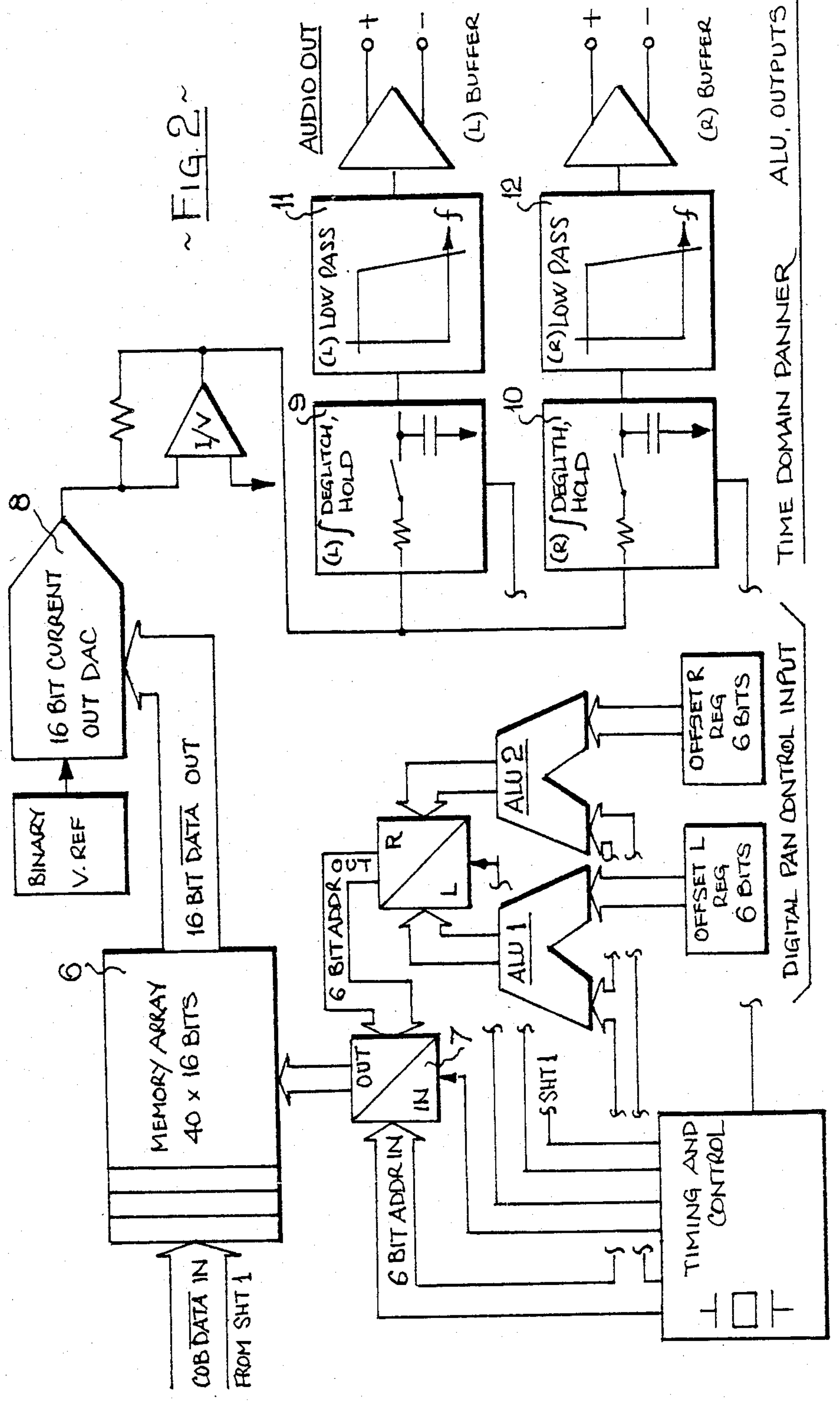
~FIG. 2~

TIME DOMAIN AUDIO PANNER

This invention relates to two channel electrical audio information which is transduced by means of a pair of stereophonic audio reproducers, and more specifically to the directional information obtained by the human auditory perception system from time, energy and frequency differentials between the two information channels.

To the listener, the utilisation of this invention in stereophonic production will offer the following advantages over the current practice of amplitude differential panning:

a more precise image a less critical listening area constant base level when image moves from centre to extremities very nearly equivalent power outputs from left and right reproducers (dependent on spectral nature of signal)

available 3 dB increase in reproduced signal to noise ratio possibility of panning beyond physical positions of the reproducers possibility of side and rear imaging possibility of vertical imaging, and equivalence to dummy head recording.

The advent of stereophonic reproduction was due to efforts to be able to capture, with a two channel recording system, aspects of the horizontal positions of sound sources within an orchestra. This was accomplished by employing two (sometimes more) microphones in one of several recognised configurations (A-B, M-S, X-Y, Blumlein, DIN, ORTF, dummy head, etc.). As a result of these efforts, domestic stereophonic reproduction systems became commonplace and two-channel records were produced as a storage medium for listening to stereo reproduction.

The development of so-called multitrack recording techniques ensued, whereby individual sources could be recorded at a different time to others in the same programme. The "spatial" information present in the final two channels, on reproduction, was and is currently imparted by amplitude differences between the two channels. The device which fulfils this function when the many tracks are mixed down to a two track (stereo) format is commonly known as a pan control or panpot. It is a one-in-two-out device whereby the relative output amplitudes are controlled.

The present invention concerns the basic intentions of such pan controls and is based on premises derived from observations concerning the arrival times at each ear of a listener from a sound source at various angular positions around the head. For a sound source directly in front of or behind the head, arrival times and spectral content at both ears are identical. As the source moves off centre, say to the right, the left ear will receive information later than the right ear owing to the path length difference. Also the spectral content will be modified owing to the obstruction posed by the head and/or pinna; the ear further from the source receiving sound energy which has its spectral content lower in energy at higher frequencies than that received by the ear closer to the source. By cross-correlating the information received by each ear based on these variables, it is assumed that the brain realises a perceived source location. It is an object of this invention to simulate these conditions so that the ear/brain system may locate phantom sound sources produced by a stereo pair of audio reproducers. It is proposed that, in accordance with the present invention, three parameters will come into play, namely frequency, amplitude and time; whereas, as previously stated, current practice ignores the frequency and time variables.

It is intended that the subject of the invention will ensure a more precise stereo image, with greater stability as the head moves away from positions equidistant from left and right reproducers. It will present a situation which is equivalent to dummy head recording, whereby a microphone is placed in or near each of the two ear canals of a dummy head, and these microphones provide the left and right signals to be transduced and reproduced. That is, the two signals at left and right outputs of the present invention will have the same or similar cross-correlation factors as those between the two outputs of the dummy head when the control is set so that the image appears at the same angular position as does the source to the frontal axis of the dummy head.

According to the invention therefore, in one of its aspects, a time domain panner comprises, in combination, a control means and a single analogue audio input signal source, connected via a buffer, an anti-aliasing filter and a sample-and-hold circuit to an analogue-to-digital converter, said converter being adapted to digitise the resulting sampled audio input into a PCM representation which is present at the input of a memory array; and a multiplexer which feeds said memory array which has a plurality of memory locations and which continuously cycles in response to a counter from zero to a maximum count and back again to zero; whereby address words produced by said counter may address said array with or without add words, so that a selected channel of said multiplexer points to a value established by said counter plus an offset; thereby time-shifting selectively the left and right channels of analogue output signals, derived from said array via a digital-to-analogue converter, with respect to said analogue input signal and with respect to each other, and including means for processing said audio signal, comprising a variable digital or analogue filter having controllable transfer characteristics which are a function of the control means.

Current technological considerations indicate that in the interests of maximising output quality, the function of the system should be implemented via digital circuitry rather than analogue. With the impending advent of digital recording consoles, wherein a digital computing system is programmed to perform the necessary functions on digitally encoded audio signals according to the respective algorithm for that function, the implementation of this invention merely requires the employment of its appropriate algorithm(s).

One embodiment of the invention will now be described herein with reference to the accompanying drawings, in which FIG. 1 is a circuit representing the input end of a time domain panner, and FIG. 2 is an interconnecting circuit representing the output end thereof.

Upon referring to the drawings it will be seen that basically the system is excited from a single analogue audio input 1 connected via a buffer 2. The next stage in the system is a low-pass filter which in the preferred embodiment is an anti-aliasing filter 3. The next stage is a sample-and-hold circuit 4 which is connected in turn to an analogue-to-digital converter 5. The anti-aliasing filter 3 is a high-cut filter which eliminates any undesirable distortion component that can arise when the input signals frequency exceeds one half of the sampling rate of the digital circuitry.

The purpose of this arrangement is to perform four basic functions in a total of 25 micro-seconds. The first function is to sample the audio input and digitize it into a 16 bit linear PCM representation. Suitable apparatus 6 for this purpose includes the so-called BURR-BROWN PCM 75. Using this apparatus, every 25 micro-seconds a 16 bit digital word comes out of the converter 5 and represents the analogue input at the sample-and-hold circuit 4. The PCM 75 is actually used to perform the conversions as well, from digital back to analogue again. Basically, over a period of 15 micro-seconds, this analogue input is digitized at the point, say, where it was started, and the process finishes at the point where a 16 bit word is produced, so moving into the centre algorithm path of the system, which essentially consists of 40 16 bit memory locations.

Each one of these memory locations is 16 bits wide. An address word is also provided, with a width of six bits, so allowing a maximum count of 40 (being 64 truncated to 40).

Of course a 16 bit input to the memory array produces a 16 bit output.

Now this 16 bit address word is delivered from a multiplexer 7 which handles 3 different representations, namely:

The first one which is simply the output from a 6 bit wide counter, counts sequentially from zero up to 40 and back to zero again, and continuously cycles.

The second input to this multiplexer is the output from the counter, and is for example the left-out cycle. We then take the same counter value and add it to an offset word, which in this case again is a 6 bit word, so that the end result, when one selects this channel of the multiplexer into the array, is to point to the word pointed to by the counter, plus an offset of a certain number of words. Thus for example each input sample into the array, starting at location zero of the array, cycles up to location 40 and then comes back again to zero, so that it continuously cycles through the array. The left-out cycle takes the same count value as that with which the input word was written into the array, except for the word added to it, so that it actually points to the pointed value plus an offset, and therefore is spaced in time, and because each one of these samples in the memory represents 25 micro-seconds, it points to a location offset in time from the entry point into the array.

The same considerations apply to the right-out cycle. Again we have an ALU, another add word (which is a different add word). Calling this new add word the right add word and again having the same counter value, we point to a different place in the array. Assuming now for example that the add word were zero in both cases, the result would be that if data were written into the array, and also if data were taken out of the array at the same point at which it was written in, thereafter there would be no delay resulting from the memory array. The minimum delay in the system would be equal to the total conversion times.

That same 16 bit word is introduced into a 16 bit DAC 8, and the latter again has a multiplexer at its output. There are two outputs of this multiplexer, namely:

One of these outputs drives the left track and hold 9, while the other output drives the right track and hold 10, and then respective output low pass filters 11 and 12, and the respective left and right channels out in audio terms.

Hence the basic procedure is to write a word into the array. If then zero is added onto the pointed value one could take the same word out of the array in terms of time and convert it back into analogue information, i.e. put it through a low pass filter, and both the left channel and the right channel would be the same as the input excitement shifted by the minimum conversion time. However if one starts to add values into these adders there is an offset in time, and that offset is proportional to the size of the add word multiplied by 25 micro-seconds, so that if the add word were say 10, there would be a 250 micro-seconds shift in time, because the total array is storing one millisecond of sound (i.e. 40 times 25 micro-seconds).

Thus the procedure basically is to take a single source, feed it into an array, and to time shift the left and the right channels with respect to the input excitement, and with respect to each other.

In certain modifications of the invention the same procedure can be implemented in other ways. For example, it may be achieved in serial fashion where basically 16 serialized bits could represent the input excitement, but this is not so convenient as the system previously described above. It will be appreciated that it would be advantageous to employ some form of signal processing hardware while the audio signal is represented with a 16 bit linear digital word, to actually perform the controlled filtering function.

In an analogue embodiment, the frequency modifying function of the system is implemented by cascading a number of poles and zeros, overlapping each other to produce the desired response, but the problem with such a system is that it is necessary for the centre frequency of the filter to be moveable. (It is very difficult to move multiple poles and zeros simultaneously, because clearly this necessitates the employment of ganged analogue components). So it is desirable to incorporate some means for processing the signal while it is still in its digital form, to implement that function.

The magnitude of the time increments above described is selected for practical purposes. At present an increment of 25 micro-seconds is contemplated and hence, because the ultimate delay is one millisecond, we have only 40 steps each of 25 micro-seconds, so that if one were to bring the control for the time domain panner up on a rotary pot between the centre section where both the left and right panner would have a delay of 25 micro-seconds (or the minimal delay step), there would be only 40 steps between centre and hard right, and between centre and hard left, and thus possibly the transitions would be audible as a series of glitches, jumps or other discontinuities; but if one could make the increments smaller, say 10 micro-seconds, then cleary up to 1 millisecond 100 steps would be available and the transitions would be less likely to be audible. At present satisfactory results are obtained when a 1 millisecond delay corresponds with a 90 degree angle to the side (that is either hard right or hard left).

Depending on the rate of change of control, some Doppler effect will be observed, and this may be desirable in certain preferred embodiments of the invention.

The claims defining the invention are as follows:

1. A time domain panner, comprising a control means, a single analogue audio input signal source, a buffer, an anti-aliasing filter, a sample-and-hold circuit, an analogue-to-digital converter, a memory array, an address counter, a digital-to-analogue converter, said source being connected via said buffer, said anti-aliasing filter and said sample-and-hold circuit to said analogue-to-digital converter, said analogue-to-digital converter being for digitizing a sampled audio input into a PCM representation which is fed as an input to said memory array which has a plurality of memory locations, a multiplexer which feeds said memory array and which continuously cycles in response to said address counter which repetitively counts to a maximum count, whereby address words produced by said address counter may address said array with or without add words and a selected channel of said multiplexer points to a value established by said address counter plus an offset, thereby time-shifting selectively analogue output signals provided from left and right analogue output channels with respect to said analogue input signal and with respect to each other, said analogue output signals being obtained from said array via said digital-to-analogue converter, and means for processing said audio signal, said means for processing comprising a variable filter having controllable transfer characteristics which are a function of said control means.

2. A time domain panner as claimed in claim 1, wherein respective left and right outputs of said digital-to-analogue converter drive further track-and-hold circuits and low-pass filters.

3. A time domain panner as claimed in claim 1, wherein said array comprises y n-bit memory locations each representing intervals of its micro-seconds, where y is a number of time intervals available to said control means, n is a number of bits each bit representing 6 db of a dynamic range of said panner, and ts is an interval between successive memory locations.

* * * * *